(No Model.)
2 Sheets—Sheet 1.

H. O. KRUSCHKE.
PLOW.

No. 589,179.
Patented Aug. 31, 1897.

WITNESSES

INVENTOR
Herman O. Kruschke
by John Wedderburn
Attorney (No Model.)

H. O. KRUSCHKE.
PLOW.

No. 589,179.

Patented Aug. 31, 1897.

WITNESSES
Saml R Turner
Jas. F. Duhamel.

INVENTOR,
Herman O. Kruschke,
by John Wedderburn
Attorney

UNITED STATES PATENT OFFICE.

HERMAN O. KRUSCHKE, OF AURORAVILLE, WISCONSIN.

PLOW.

SPECIFICATION forming part of Letters Patent No. 589,179, dated August 31, 1897.

Application filed December 29, 1896. Serial No. 617,339. (No model.)

*To all whom it may concern:*

Be it known that I, HERMAN O. KRUSCHKE, a citizen of the United States, residing at Auroraville, in the county of Waushara and State of Wisconsin, have invented certain new and useful Improvements in Plows; and I do hereby declare the following to be a full, clear, and exact description of the invention, such as will enable others skilled in the art to which it appertains to make and use the same.

This invention has reference to a novel construction in what are termed "marsh-plows"—that is to say, a plow for use in turning the ground that is soft and sticky, and which is usually drawn or propelled by a traction-engine or cable instead of by horses or mules, the ground being too soft for the employment of the latter.

The object of the invention is to provide a construction in the plow whereby the soil that is raised and turned by the moldboard of the plow is spread and smoothed out by the attachment hereinafter to be described.

The invention consists in the features of construction hereinafter fully described and claimed.

Figure 1:
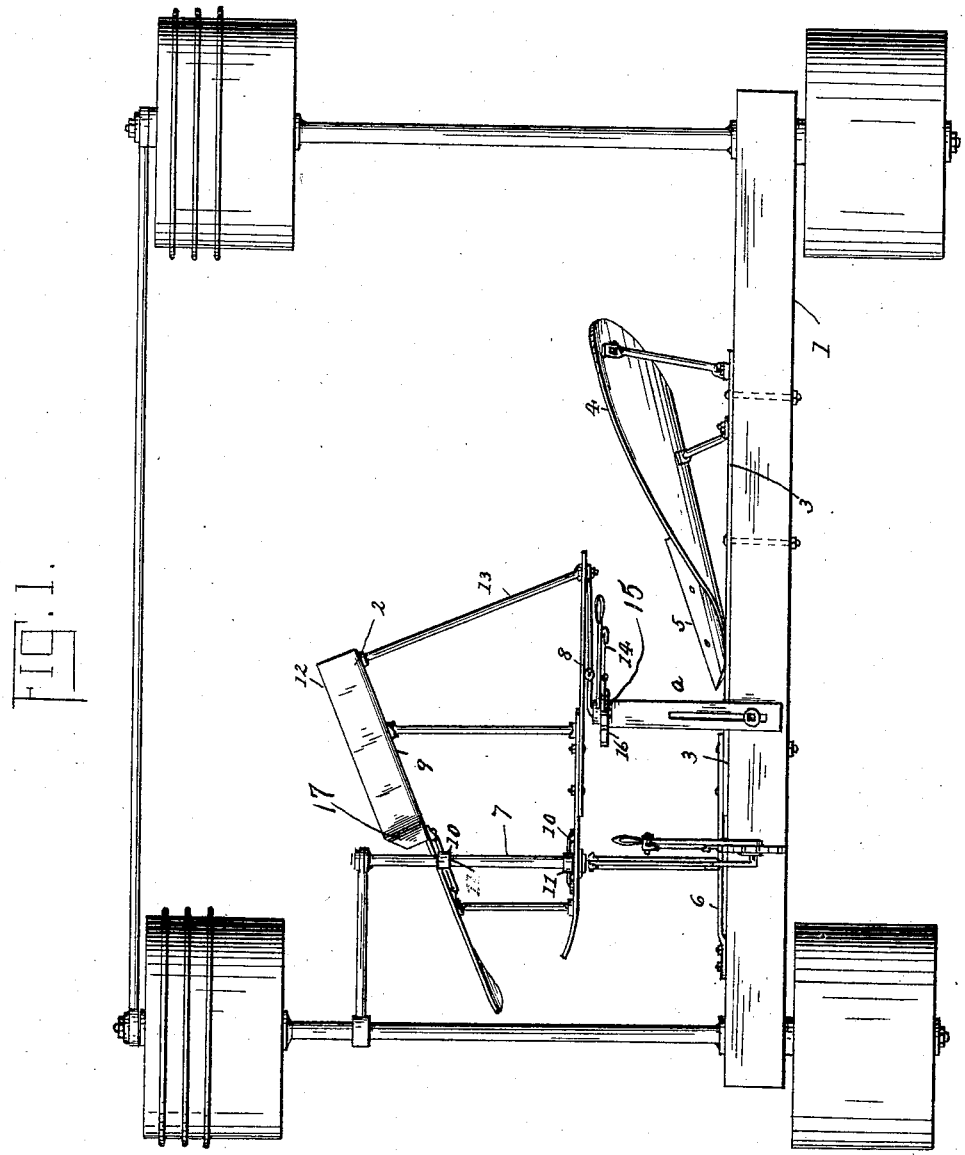
Figure 2:
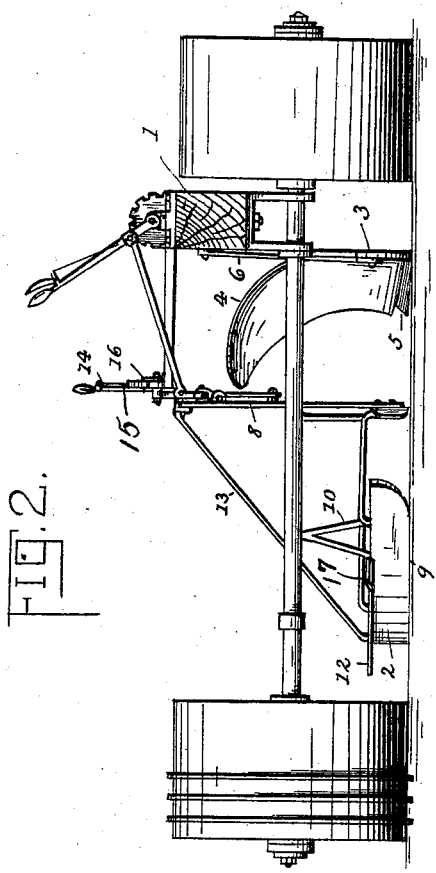
Figure 3:
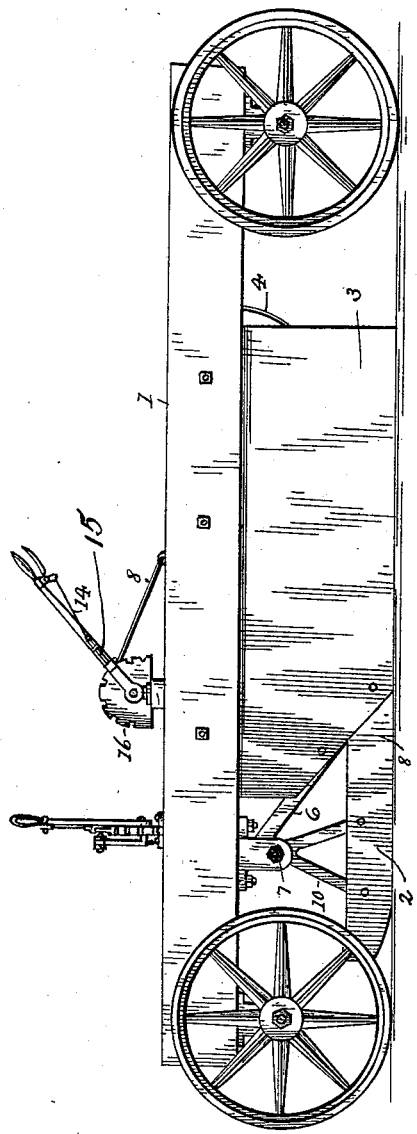

In the accompanying drawings, forming a part of this specification, Figure 1 is a top plan of a portion of a marsh-plow constructed in accordance with this invention and illustrating also the manner in which the plow and soil-spreading attachment act. Fig. 2 is a front end elevation. Fig. 3 is a side elevation.

Referring now to said drawings, 1 indicates the plow-beam, which in a plow of this construction is usually carried at its ends by shafts that are supported by rollers having an extended periphery, whereby they are prevented from sinking into the soft soil. As this invention does not relate to the means for propelling the plow, this construction is not illustrated and may consist either of a traveling cable, to which the plow and its rollers are secured, or may be a traction-engine carried by the plow itself. It is found that in plowing this marshy ground that owing to the fact that the upper stratum is lighter than the lower stratum it is more difficult to turn than ground where the surface stratum is the lighter, and, furthermore, owing to the sticky nature of the soil it is not so easily broken up as drier soil, and therefore is liable to remain in the same position as it is left by the moldboard. To overcome this objectionable feature, I provide what might be termed a "spreader" 2, carried by said beam 1, and which serves to not only open the furrow which has been made by the plow, but to take the overturned soil, spread it out upon the furrow side, and smooth the top of the same, thus leaving a practically rectangular furrow with clean walls to receive the overturned soil of the next furrow. The said beam 1 is provided with an upright plate 3, which serves as a landside, and a moldboard 4. This moldboard is curved sufficiently to cause the cut soil to be completely overturned, and is provided at its lower edge with a knife 5, while the colter-bar 6 extends in front of the plate 3 and is secured at its upper end to the beam 1. Near the front end of the said beam is a laterally-projecting shaft or arm 7, suitably braced to said beam and to which the spreader 2 is secured. The said spreader 2 consists of an upright plate 8, extending longitudinally or parallel with the beam 1, and an inclined or angular plate 9. These plates 8 and 9 converge toward their front ends, as shown, and are suitably braced together and provided with upright posts 10, having openings to receive the shaft 7. The spreader is held in place, but adjustably, on said shaft 7 by means of the collars 11, situated upon opposite sides of the posts 10 and to be held upon the shaft 7 by means of set-screws. In this way it will be seen that the spreader can be moved bodily away from or toward the beam and at right angles thereto. These control the width of the furrow and will be hereinafter described.

It will be seen that the inclined or angular plate of the spreader is provided at its rear end portion with an outwardly-turned or horizontal flange 12, to be hereinafter referred to. The said spreader is also provided with the rearwardly-extending brace-rods 13, that are pivotally connected at their rear ends to the pivoted lever 14, mounted upon the laterally-extending arm *a* of the beam 1. This lever 14 is controlled by a detent 15 and a toothed rack 16, whereby the spreader may be held in operative position upon the ground, or it may be released to be drawn upwardly out of its operative position. It will be seen that the spreader is in advance of the plow and to one side of the moldboard, and the operation of this spreader will now be described.

In using a plow of this construction a ditch of sufficient width is first cut to receive the spreader 2, and the plow starting at the end of this ditch will turn the first furrow. The spreader passes along within this ditch with the inclined plate spreading the soil toward the outside, while the flange 12, which is provided with an upturned or curved forward end 17, smooths the surface of the soil, so that the outer wall of the furrow stands practically at right angles to the surface of the ground, and these parts have a square corner. The said spreader is held down to its work by the brace-rods and lever 14, and, for instance, when this device is used in connection with the plate that is drawn back and forth by the traveling cable, when the end of the furrow is reached the spreader 2 is drawn upwardly and out of the ground by means of the lever 14, so that it rests upon the front shaft of the plow. Of course suitable means are employed for operating the plow to raise it out of contact with the ground as the plow returns to the end of the furrow for the purpose of cutting another furrow. In cutting a second furrow the spreader passes along in the furrow first cut and spreads out and smooths the ground, as first described.

Having thus described my invention, what I claim as new, and desire to secure by Letters Patent, is—

1. The combination with a plow-beam and its plow, of a spreader situated in front of the same and consisting of an inner plate practically parallel with said beam, and an outer inclined plate.

2. The combination with a plow-beam and its plow, of a spreader situated in front of the same and consisting of an inner plate practically parallel with said beam, and an outer inclined plate provided with an overhanging flange.

3. The combination with a plow-beam and its plow, of a spreader situated in front of the same and consisting of an inner plate practically parallel with said beam, and an outwardly-inclined plate provided with an inclined flange having an upturned or curved forward end.

4. The combination with a beam and plow, of a spreader adjustably secured to one side thereof and in advance of said plow.

5. The combination with a beam and plow, of a laterally-extending arm, a spreader pivotally mounted upon said arm, and movably connected at its rear end with said arm.

6. The combination with a beam and a plow, of a laterally-extending arm upon said beam and attached to said plow, a spreader pivotally mounted upon said arm, and a lever mounted upon said beam in the rear of said spreader and pivotally connected with said spreader.

In testimony whereof I have signed this specification in the presence of two subscribing witnesses.

HERMAN O. KRUSCHKE.

Witnesses:
B. E. UPTON,
C. A. PECK.